(12) United States Patent
Xia et al.

(10) Patent No.: US 8,902,785 B2
(45) Date of Patent: Dec. 2, 2014

(54) METHOD, APPARATUS AND SYSTEM FOR FINDING AND SELECTING PARTNERS

(71) Applicant: NTT DoCoMo, Inc., Tokyo (JP)

(72) Inventors: Xin Xia, Beijing (CN); Yongsheng Zhang, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 91 days.

(21) Appl. No.: 13/717,950

(22) Filed: Dec. 18, 2012

(65) Prior Publication Data

US 2013/0170373 A1    Jul. 4, 2013

(30) Foreign Application Priority Data

Dec. 21, 2011  (CN) .......................... 2011 1 0432504

(51) Int. Cl.
| | |
|---|---|
| *G01R 31/08* | (2006.01) |
| *H04W 72/04* | (2009.01) |
| *H04W 4/02* | (2009.01) |
| *H04W 40/32* | (2009.01) |
| *H04W 8/00* | (2009.01) |
| *H04W 76/02* | (2009.01) |

(52) U.S. Cl.
CPC .............. *H04W 72/04* (2013.01); *H04W 4/023* (2013.01); *H04W 40/32* (2013.01); *H04W 8/005* (2013.01); *H04W 76/02* (2013.01)
USPC .......................................... 370/252; 370/328

(58) Field of Classification Search
CPC ..... H04W 24/04; H04W 40/32; H04W 48/16; H04W 4/00; H04W 4/023; H04W 72/04; H04W 76/00; H04W 76/02; H04W 84/047; H04W 88/10; H04W 8/005; H04W 92/20
See application file for complete search history.

(56) References Cited

U.S. PATENT DOCUMENTS

| | | | | |
|---|---|---|---|---|
| 2003/0195984 | A1* | 10/2003 | Zisapel et al. | 709/238 |
| 2006/0053216 | A1* | 3/2006 | Deokar et al. | 709/223 |
| 2006/0083177 | A1* | 4/2006 | Iyer et al. | 370/252 |
| 2008/0287062 | A1* | 11/2008 | Claus et al. | 455/41.2 |

* cited by examiner

*Primary Examiner* — David Oveissi
(74) *Attorney, Agent, or Firm* — Harness, Dickey & Pierce, PLC

(57) ABSTRACT

Finding and selecting partners in a MiAN Cluster system is accomplished by a slave, a pairing request for requesting a pairing with a master to a server; receiving, by the slave, proximity information returned from the server based on the pairing request, the proximity information including information of working channels of a proximity interface of the master of the first kind, the master of the first kind being a master determined by the server according to the first geographical location and a geographical location of a master of the second kind previously obtained and supporting a clustering function where a distance between it and the slave meets a predetermined threshold; performing, by the slave, search on the corresponding channels according to the proximity information, and establishing a communication connection with the proximity interface of the master when a master is found.

17 Claims, 6 Drawing Sheets

METHOD, APPARATUS AND SYSTEM FOR FINDING AND SELECTING PARTNERS

FIELD OF THE INVENTION

The present invention relates to the field of mobile telecommunication technology, in particular to a method, an apparatus and a system for quickly finding and selecting partners in a Mobile Internet Access Node Cluster System based on location.

DESCRIPTION OF THE PRIOR ART

Mobile Internet Access Node (MiAN) is a device provided with both wireless WAN and wireless LAN access capabilities. Its wireless WAN interface may be any standardized cellular network system, such as WCDMA, CDMA, WiMAX, LTE, and LTE-A, and its wireless LAN interface may be implemented on the basis of 802.11 WiFi. Apart from the above two necessary interfaces, MiAN may also be provided with a Proximity Interface for intercommunication between the access nodes. Such interface may be implemented via various communication technologies, for example, via a short-distance communication technology such as Bluetooth or Zigbee, or via 802.11 WiFi, or via a wired connection such as Ethernet or RJ45. The Proximity Interface may be a separate physical entity interface (see FIG. 1), or a logical, physical entity interface shared with a wireless LAN (see FIG. 2).

Wireless Internet Device (WiD) is a device having a wireless LAN interface and supporting various Internet applications, such as a smart phone, a digital camera and a game console.

FIG. 3 is a schematic view showing an MiAN Cluster System (hereinafter referred to as Cluster System). The Cluster System is a cluster of MiANs (merely a master MiAN and a slave MiAN are shown in FIG. 3). The WAN output links of the access nodes flexibly cluster together to effect bandwidth sharing therebetween, and thereby to solve the bottleneck problem in the system bandwidth of the WAN output links. For the specific clustering ways and structures, reference may be made to the Chinese patent application "Mobile Internet Access Node, and Method and System for Clustering Bandwidth" with the application No. 2011101450007.

It is a significant function for the MiAN Cluster System to find the potential partners capable of forming a cluster system in a quick, effective and accurate manner. If a method based on the traditional technology is adopted for finding the partners, such a method generally includes three stages, i.e., setting up physical channel pairing and link layer connection, setting up the binding relationship, and sharing the bandwidth/service. As a result, it will take more time and power.

SUMMARY OF THE INVENTION

The technical problem to be solved by the present invention is to provide a method, an apparatus and a system for quickly finding and selecting partners in a Mobile Internet Access Node Cluster System based on location, so as to accelerate the process of finding, selecting and binding the partners in the MiAN cluster system.

In order to solve the above-mentioned problem, the present invention provides a method for finding and selecting partners in an MiAN Cluster system comprising a server, one or more master MiANs and one or more slave MiANs, each including a Proximity Interface for establishing a communication connection with the other MiANs. The method comprises the steps of:

sending, by the slave MiAN, a pairing request for requesting a pairing with the master MiAN to the server, the pairing request carrying information of a first geographical location of the slave MiAN;

receiving, by the slave MiAN, proximity information returned from the server based on the pairing request, the proximity information including information of working channels of a Proximity Interface of a master MiAN of the first kind, the master MiAN of the first kind being a master MiAN determined by the server according to the first geographical location and a geographical location of a master MiAN of the second kind previously obtained and supporting a clustering function where a distance between it and the slave MiAN meets a predetermined threshold; and performing, by the slave MiAN, search on a corresponding channel based on the proximity information, and establishing a communication connection with the Proximity Interface of a master MiAN when the master MiAN is found.

Preferably, the pairing request further carries information of search radius, and the predetermined threshold is further determined by the server according to the search radius.

Preferably, prior to sending, by the slave MiAN, the pairing request to the server, the method further comprises:

registering, by the master MiAN of the second kind, with the server in advance, and sending information of its geographical location and working channels to the server during the registration so that the server obtains the information of the geographical location and the working channels of the master MiAN supporting a clustering function.

Preferably, in the method, the server further obtains parameters including a current load of a WAN interface of the master MiAN of the second kind, a bandwidth of the WAN interface, and a type of the network accessed through the WAN interface.

The server determines a search order of the working channels of the Proximity Interface of the master MiAN of the first kind according to at least one of the parameters selected from a group consisting of a distance between the master MiAN of the first kind and the slave MiAN, a bandwidth of the WAN interface of the master MiAN of the first kind, a current throughput of the WAN interface, and a type of the network accessed through the WAN interface, and sends the search order to the slave MiAN.

The slave MiAN further performs search on the corresponding channels sequentially according to the search order.

Preferably, in the method, the server further obtains parameters including a current load of a WAN interface of the master MiAN of the second kind, a bandwidth of the WAN interface, and a type of the network accessed through the WAN interface.

The proximity information further comprises at least one of the parameters selected from the group consisting of a distance between the master MiAN of the first kind and the slave MiAN, a bandwidth of a WAN interface of the master MiAN of the first kind, a current throughput of the WAN interface, and a type of the network accessed through the WAN interface.

The step of performing, by the slave MiAN, search on a corresponding channel based on the proximity information comprises:

determining, by the slave MiAN, a search order of the working channels of the Proximity Interface of the master MiAN of the first kind according to the at least one parameter; and performing, by the slave MiAN, search on the corresponding channels sequentially according to the search order.

Preferably, in the method, when there are two or more parameters in at least one of the parameters, the step of determining a search order of the working channels of the Proximity Interface of the master MiAN of the first kind comprises:

determining a priority of each of the two or more parameters; and judging superiority of the same parameter of the master MiANs of the first kind sequentially in a descending order of the priorities, so as to determine the search order of the working channels, wherein when it is judged that a first parameter of a first master MiAN is better than a first parameter of a second master MiAN, the search on the working channels of the Proximity Interface of the first master MiAN is performed prior to that on the working channels of the Proximity Interface of the second master MiAN.

The present invention further provides a slave MiAN, comprising:

a pairing requesting unit is configured to send a pairing request for requesting a pairing with a master MiAN to a server, the pairing request carrying information of a first geographical location of the slave MiAN;

a proximity information receiving unit is configured to receive proximity information returned from the server based on the pairing request, the proximity information including information of working channels of a Proximity Interface of a master MiAN of the first kind, the master MiAN of the first kind being a master MiAN determined by the server according to the first geographical location and a geographical location of a master MiAN of the second kind previously obtained and supporting a clustering function where a distance between it and the slave MiAN meets a predetermined threshold; and a pairing unit is configured to perform search on a corresponding channel based on the proximity information and establish a communication connection with the Proximity Interface of a master MiAN when the master MiAN is found.

Preferably, in the slave MiAN, the pairing request further carries information of search radius so that the server determines the predetermined threshold according to the search radius.

Preferably, in the slave MiAN, the proximity information further comprises at least one of the parameters selected from the group consisting of a distance between the master MiAN of the first kind and the slave MiAN, a bandwidth of a WAN interface of the master MiAN of the first kind, a current throughput of the WAN interface, and a type of the network accessed through the WAN interface.

The pairing unit comprises:

a first order determining unit is configured to determine a search order of the working channels of the Proximity Interface of the master MiAN of the first kind according to the at least one parameter; and a searching unit is configured to perform search on the corresponding channels sequentially according to the search order.

Preferably, in the slave MiAN, when there are two or more parameters in at least one of the parameters, the first order determining unit comprises:

a first priority determining unit is configured to determine a priority of each of the two or more parameters; and a first judging unit is configured to judge superiority of the same parameter of the master MiANs of the first kind sequentially in a descending order of the priorities, so as to determine the search order of the working channels, wherein when it is judged that a first parameter of a first master MiAN is better than a first parameter of a second master MiAN, the search on the working channels of the Proximity Interface of the first master MiAN is performed prior to that on the working channels of the Proximity Interface of the second master MiAN.

Preferably, in the slave MiAN, when the first parameter has a continuous value range and the value range is divided into more than two numerical ranges not overlapped with each other in advance, it is judged that the first parameter of the first master MiAN is better than the first parameter of the second master MiAN by judging whether a first numerical range of the first parameter of the first master MiAN is better than a second numerical range of the first parameter of the second master MiAN. If the first numerical range is the same as the second numerical range, it is judged that the first parameter of the first master MiAN is equal to the first parameter of the second master MiAN.

The present invention further provides a server, comprising:

a receiving unit is configured to receive from a slave MiAN a pairing request for requesting a pairing with a master MiAN, the pairing request carrying information of a first geographical location of the slave MiAN;

a determining unit is configured to determine a master MiAN of the first kind according to the first geographical location and a geographical location of a master MiAN of the second kind previously obtained and supporting a clustering function where a distance between it and the slave MiAN meets a predetermined threshold; and a responding unit configured to return proximity information to the slave MiAN, the proximity information including information of working channels of a Proximity Interface of the master MiAN of the first kind, so that the slave MiAN searches the master MiAN on a corresponding channel and establishes a communication connection between the proximity interfaces of the slave MiAN and a master MiAN when the master MiAN is found.

Preferably, the pairing request further carries information of search radius, and the determining unit is further configured to determine the predetermined threshold according to the search radius.

Preferably, the server further comprises:

a registering unit is configured to accept registration of the master MiAN of the second kind, and obtain the information of the geographical location and the working channels during the registration from the server.

Preferably, the server further comprises:

a parameter acquiring unit is configured to acquire parameters including a current load of a WAN interface of the master MiAN of the second kind, a bandwidth of the WAN interface and a type of the network accessed through the WAN interface; and a second order determining unit is configured to determine a search order of the working channels of the proximity interface of the master MiAN of the first kind according to at least one of the parameters selected from the group consisting of a distance between the master MiAN of the first kind and the slave MiAN, a bandwidth of a WAN interface of the master MiAN of the first kind, a current throughput of the WAN interface, and a type of the network accessed by the WAN interface, and send the search order to the slave MiAN so that the slave MiAN performs search on the corresponding channels sequentially according to the search order.

Preferably, in the server, when there are two or more parameters in at least one of the parameters, the second order determining unit comprises:

a second priority determining unit is configured to determine a priority of each of the two or more parameters; and a second judging unit is configured to judge superiority of the same parameter of the master MiANs of the first kind sequentially in a descending order of the priorities, so as to determine the search order of the working channels, wherein when it is judged that a first parameter of a first master MiAN is better than a first parameter of a second master MiAN, the search on the working channels of the Proximity Interface of the first master MiAN is performed prior to that on the working channels of the Proximity Interface of the second master MiAN.

The present invention further provides an MiAN cluster system, comprising a server, one or more master MiANs and one or more slave MiANs, each of the MiANs including a Proximity Interface for establishing a communication connection with the other MiANs, wherein the server is configured to receive a pairing request from the slave MiAN, determine a master MiAN of the first kind according to a first geographical location of the slave MiAN and a geographical location of a master MiAN of the second kind previously obtained and supporting a clustering function where a distance between it and the slave MiAN meets a predetermined threshold, and return proximity information to the slave MiAN;

the slave MiAN is configured to send a pairing request for requesting a pairing with the master MiAN to the server, the pairing request including information of a first geographical location of the slave MiAN receive the proximity information returned from the server based on the pairing request, the proximity information including information of the working channels of a Proximity Interface of the master MiAN of the first kind, perform search on a corresponding channel based on the proximity information, and establish a communication connection with the Proximity Interface of a master MiAN when the master MiAN is found; and the master MiAN is configured to, when supporting a clustering function, perform registration with the server, and send the information of its geographical location and the working channels to the server during the registration.

As can be seen from the above, according to the method, apparatus and system for quickly finding and selecting partners in an MiAN Cluster system based on location, the slave MiAN aims to perform search so as to effect the pairing. The search is performed on the working channels of the master MiAN of the first kind which is located within the search radius and supports a clustering function, but rather than on the channels in a full band one by one as mentioned in the prior art. Moreover, a master MiAN that supports a clustering function operates on the searched channels according to the present invention, and as a result, the circumstance in the prior art where the binding operation is rejected by the master MiAN during the binding will be avoided. Therefore, according to the present invention, the time and power consumption during the process of finding, selecting and binding partners in the MiAN Cluster system will be reduced, and the process of finding and selecting partners will be accelerated. In addition, according to the present invention, a more suitable master MiAN may be selected for pairing based on the search order. Finally, it is unnecessary to change the current protocol standard or the hardware architecture of the equipment, thus the present invention provides excellent compatibility.

DETAILED DESCRIPTION OF THE PREFERRED EMBODIMENTS

The present invention will be described hereinafter in conjunction with the drawings and the embodiments so as to make the objects, the technical solutions and the advantages of the present invention more apparent.

In a current MiAN Cluster System, it is necessary to perform search and communication on the channels one by one so as to establish a link layer connection between the MiANs, and many channels may not include corresponding MiANs, or access nodes that are willing to join the Cluster System. In addition, the processes of finding and binding the link layers in the conventional method are isolated and sometimes repeated, and as a result such processes will be delayed for a long period of time and unnecessary power consumption will occur. Usually, these are intolerable for the mobile equipment such as an MiAN.

Embodiments of the present invention provide a method for finding and selecting partners in an MiAN Cluster system including a server, one or more master MiANs, and one or more slave MiANs. Each MiAN comprises a Proximity Interface for establishing a communication connection with the other MiANs and can be operated at either a master mode or a slave mode which can be designated through manual configuration. The MiAN operating at the slave mode can establish a communication connection with a master MiAN through the Proximity Interfaces, and a master MiAN can establish a communication connection with a plurality of slave MiANs through the Proximity Interfaces, thereby to achieve the functions such as bandwidth clustering and service sharing.

Figure 1:
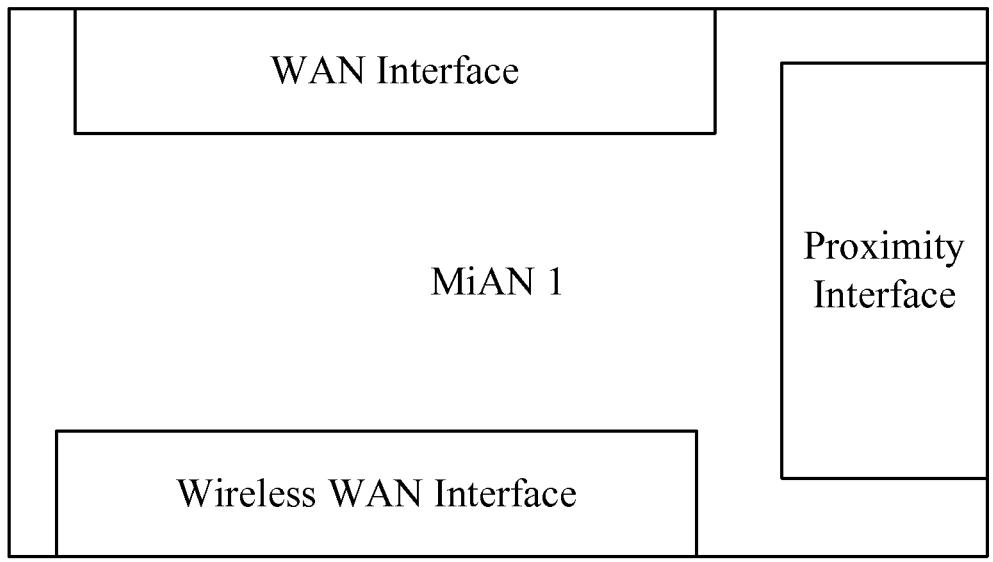
FIG. 1 is a structural schematic view showing a Proximity Interface of an MiAN.
Figure 2:
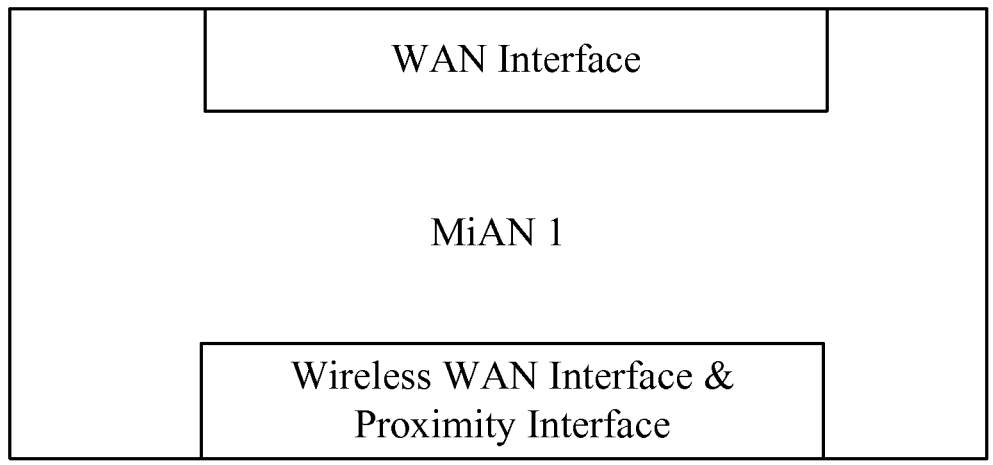
FIG. 2 is another structural schematic view showing the Proximity Interface of the MiAN.
Figure 3:
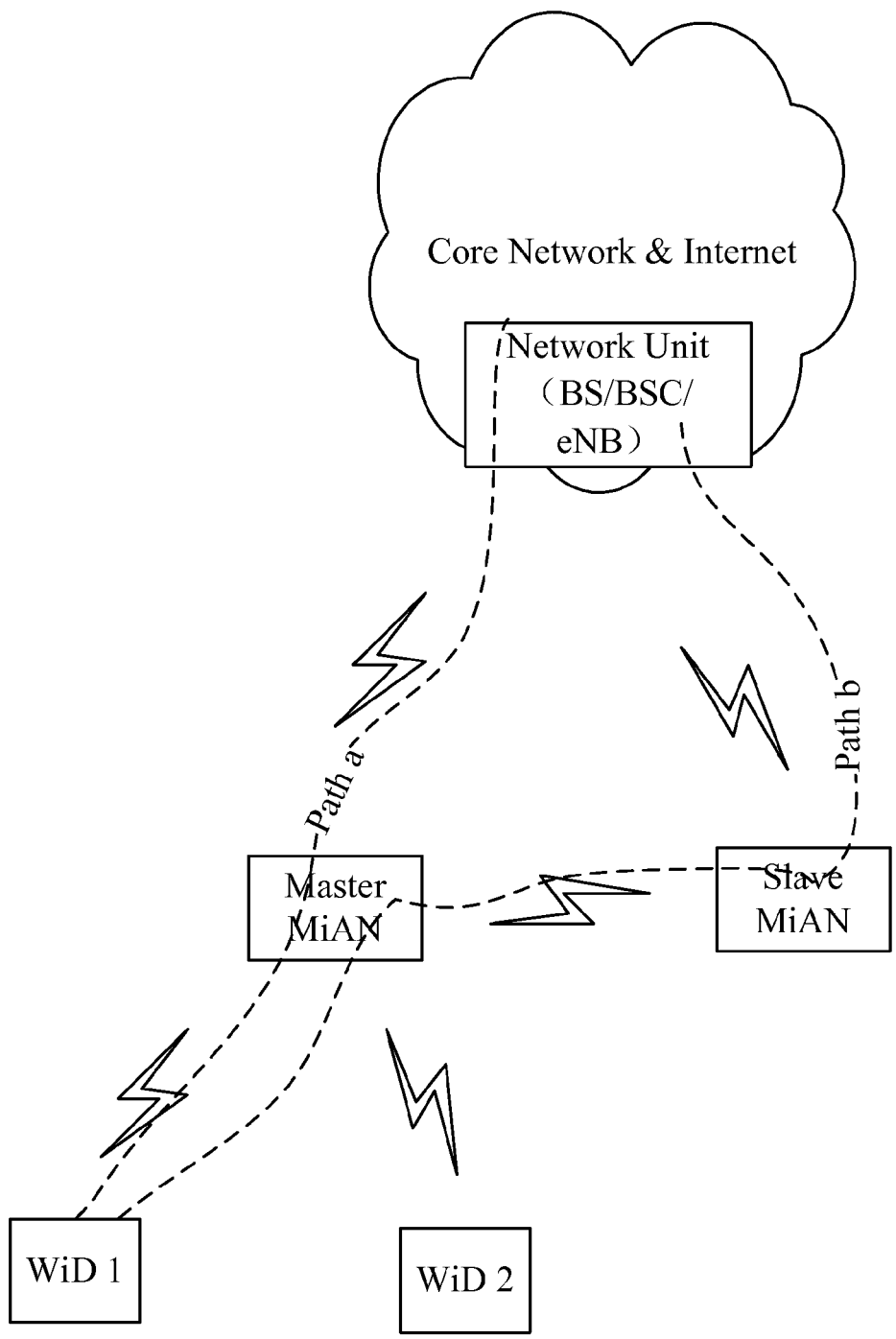
FIG. 3 is a structural schematic view showing an MiAN Cluster system.
Figure 4:
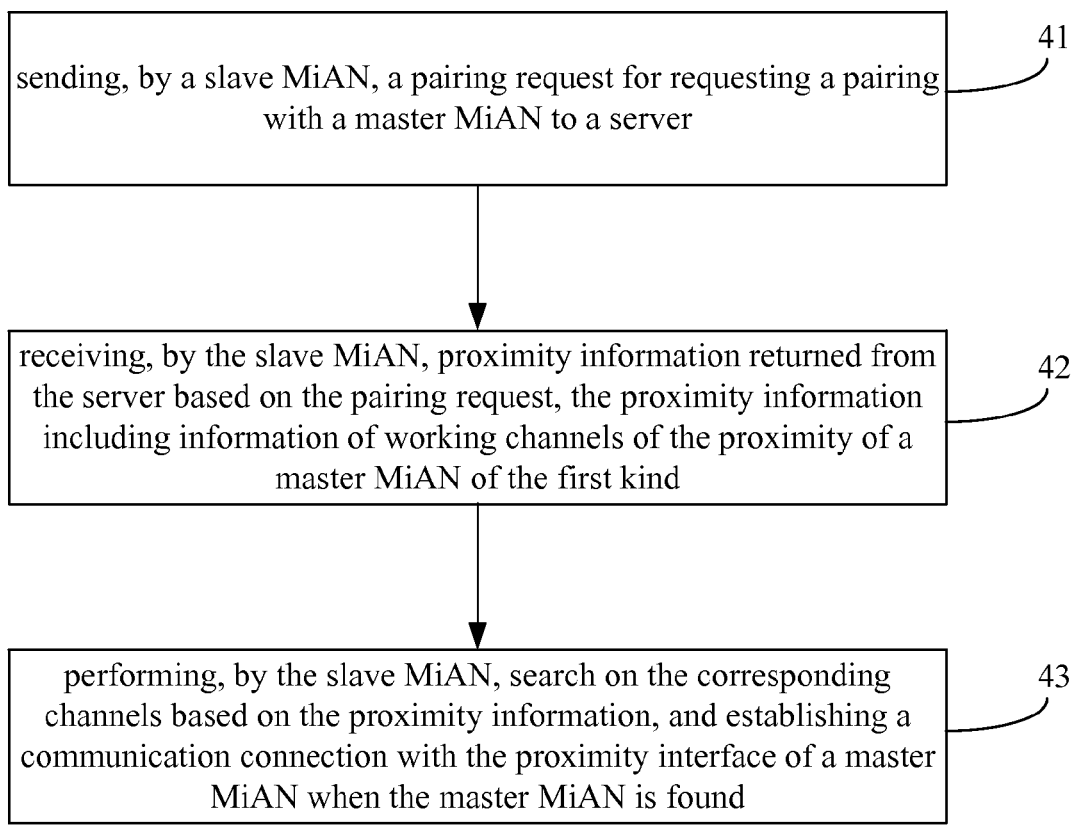
FIG. 4 is a flow chart of a method for finding and selecting partners according to embodiments of the present invention.
Figure 5:
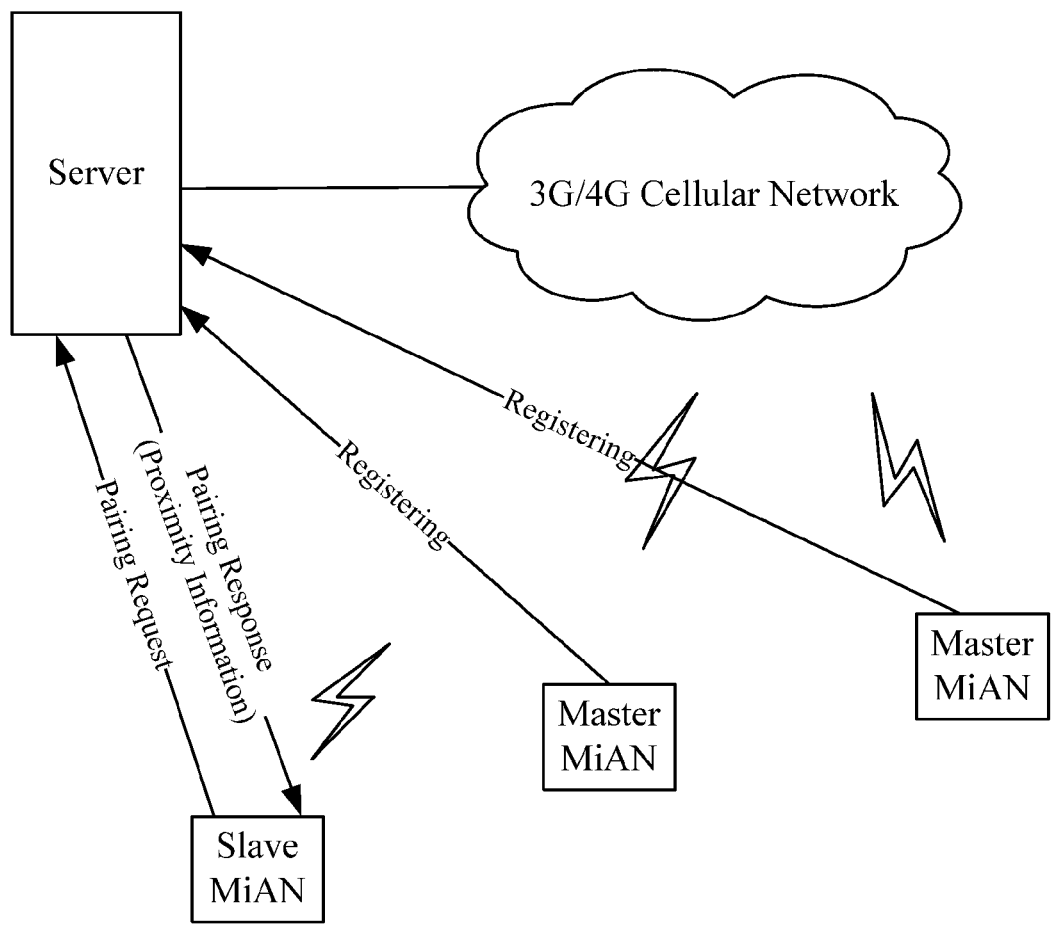
FIG. 5 is another flow chart of the method for finding and selecting partners according to embodiments of the present invention.

Referring to FIGS. 4 and 5, the method according to the embodiment of the present invention comprises the following steps.

Step 41: the slave MiAN sends a pairing request for requesting a pairing with the master MiAN to the server, wherein the pairing request carries information of a first geographical location of the slave MiAN.

Here, prior to initiating the pairing request, the slave MiAN can obtain its geographical location by means of the existing location technologies such as GPS (Global Position System), AGPS (Auxiliary Global Position System), and mobile base station location technologies. The geographical location may be represented by latitude and longitude coordinates. The slave MIAN may further obtain information of location accuracy of the geographical location and search radius, and then send them to the server. The search radius indicates the radius within which the slave MiAN wants to search the mater MiAN to be paired. Due to rapid attenuation of the wireless signal along with an increase of the distance, the master MiAN close to the slave MiAN usually has high signal quality. A suitable search radius may be designated according to the real environment and the use experience.

Step 42: the slave MiAN receives proximity information returned from the server based on the pairing request. The proximity information includes information of working channels of a proximity interface of a master MiAN of the first kind. The master MiAN of the first kind is a master MiAN determined by the server according to the first geographical location and a geographical location of the master MiAN of the second kind previously obtained and supporting a clustering function where a distance between it and the slave MiAN meets a predetermined threshold.

Here, the server collects and stores in advance the geographical location of a master MiAN of the second kind that supports a clustering function. The term "supporting a clustering function" means that the master MiAN supports establishing a communication connection with a proximity interface of the slave MiAN. A user may determine whether the master MiAN supports the clustering function or not through manual configuration.

The server may set the predetermined threshold according to the search radius sent by the slave MiAN in Step 41, select a master MiAN of the first kind located within the search radius from the master MiANs of the second kind according to the geographical locations of the master MiANs of the second kind and the slave MiANs, and return the proximity information, such as the working channels of the proximity interface of the master MiAN of the first kind, to the slave MiAN. The proximity information may be carried in a pairing response to the pairing request returned from the server to the slave MiAN.

Step 43: the slave MiAN performs search on a corresponding channel according to the proximity information, and establishes a communication connection with the proximity interface of the master MiAN when the master MiAN is found.

Here, the working channels of the master MiAN of the first kind which is located within the search radius and supports a clustering function are obtained, and accordingly the slave MiAN may perform scanning on these channels. When it is successful to establish the communication connection with the searched master MiAN through the proximity interfaces, the process is terminated. The step of establishing a communication connection through the proximity interfaces may include: performing search on a link layer, establishing a link layer pairing with the master MiAN through link layer authentication and association if a master MiAN is found and the link quality of the master MiAN meets a predetermined condition; and establishing a binding relationship with the master MiAN on an IP layer through a binding request.

It can be seen that, prior to performing link layer search, the slave MiAN that initiates the pairing request requests information of the potential master MiANs in an adjacent area from the server. After receiving the request, the server calculates the potential master MiANs around the slave MiAN according to the requested search range, and sends the configuration information of the master MiANs together with the corresponding parameters such as distance in the form of a Proximity Information Table to the slave MiAN. When the server calculates the adjacent area, the accuracy of location information and the search radius may be taken into consideration, and if the location accuracy is poor, the search range may be extended appropriately.

Therefore, according to the embodiment of the present invention, search of the channels may be performed in Step 43 accordingly. Such search is performed on the working channels of the master MiANs of the first kind that are located within the search radius and support a clustering function, but rather than on the channels in a full band one by one as mentioned in the prior art. Moreover, a master MiAN that supports a clustering function operates on the searched channels. As a result, the circumstance in the prior art where the binding operation is rejected by the master MiAN during the binding process will be avoided. Therefore, according to the embodiment of the present invention, the time and power consumption during the process of finding, selecting and binding partners in the MiAN cluster system will be reduced, and the process of finding and selecting partners will be accelerated.

In Step 43, if it is still unsuccessful to establish a communication connection with the proximity interface of the master MiAN after all the working channels of the proximity interface of the master MiAN of the first kind have been searched, the existing full-band searching method may be used to perform search on all the channels one by one, so as to find a suitable master MiAN and establish the communication connection therewith.

In order to collect at the server the relevant configuration information of the master MiANs of the second kind in advance, prior to Step 41, the method of the embodiment of the present invention may further comprise the following steps. The master MiAN of the second kind performs registration with the server in advance, and sends information of its geographical location and the working channels to the server during the registration, so that the server obtains information of the geographical location and the working channels of the master MiAN supporting the clustering function. Here, the master MiAN may determine on its own whether or not to join the cluster system and perform the registration, and in particular, both network status and load condition of the current WAN may be taken into consideration. Of course, the registration may also be initiated manually, or after large-scale movement is detected by the master MiAN.

In Step 43, when searching the master MiANs on the corresponding channels, the slave MiAN may further perform search according to a predetermined search order. When it is unsuccessful to establish a communication connection with the proximity interface of the master MiAN on the currently-searched channel, the slave MiAN continues to perform search on a next channel according to the search order, until the communication connection is established or all the working channels of the proximity interface of the master MiAN of the first kind have been searched.

According to the embodiment of the present invention, the search order may be determined by the server or the slave MiAN. When determining the search order, the server or the slave MiAN may set the search order according to one parameter, or two or more parameters. Here, the parameters that may be taken into consideration include but not limited to:

(1) a distance between the master MiAN of the first kind and the slave MiAN;

(2) a bandwidth of a WAN interface of the master MiAN of the first kind;

(3) a current throughput of the WAN interface of the master MiAN of the first kind; and (4) a type of the network accessed through the WAN interface of the master MiAN of the first kind, such as WCDMA network, TD-SCDMA network, CDMA 2000 network, WiMAX network, LTE network and LTE-A network.

The server may obtain the geographical location of the master MiAN during the registration, and calculate the distance between the master MiAN of the first kind and the slave MiAN according to the geographical locations of the master MiAN and the slave MiAN. The master MiAN may send the parameters such as the bandwidth of its WAN interface, the current load and the type of the network accessed through the WAN interface to the server during the registration, so that the server can obtain the parameters. Of course, during the running process of the system, the master MiAN may also periodically report the parameters such as the bandwidth of the WAN interface and the current load to the server in real time.

When determining the search order, the server determines, after receiving the pairing request from the slave MiAN, the search order of the working channels of the proximity interface of the master MiAN of the first kind according to at least one of the parameters selected from the group consisting of the distance between the master MiAN of the first kind and the slave MiAN, the bandwidth of the WAN interface of the master MiAN of the first kind, the current throughput of the WAN interface, and the type of the network accessed through the WAN interface, and sends the search order to the slave MiAN. To be specific, when returning the proximity information to the slave MiAN, the server may further return the search order to the slave MiAN. As a result, in Step 43, the slave MiAN may perform search on the corresponding channels sequentially according to the search order.

When the slave MiAN determines the search order, the server returns the proximity information to the slave MiAN after receiving the pairing request from the slave MiAN, and the proximity information carries at least one of the parameters selected from the group consisting of the distance between the master MiAN of the first kind and the slave MiAN, the bandwidth of the WAN interface of the master MiAN of the first kind, the current throughput of the WAN interface, and the type of the network accessed through the WAN interface. In Step 43, the slave MiAN determines the search order of the working channels of the proximity interface of the master MiAN of the first kind according to at least one of the parameters, and performs the search on the corresponding channels sequentially according to the search order.

How to determine the search order by the server or the slave MiAN will be described hereinafter.

1) when Merely One Parameter is Taken into Consideration:

When merely one parameter is taken into consideration, the search order is determined according to the parameter. When the parameter of a first mater MiAN in the master MiANs of the first kind is better than that of a second master MiAN, the search order of the working channels of the proximity interface of the first master MiAN is prior to that of the working channels of the proximity interface of the second master MiAN.

For instance, when the parameter is a distance between the master MiAN of the first kind and the slave MiAN, the shorter the distance, the better the parameter. If a first distance between the first master MiAN and the slave MiAN is 30 m and a second distance between the second master MiAN and the slave MiAN is 50 m, the search order of the working channels of the proximity interface of the first master MiAN is prior to the search order of the working channels of the proximity interface of the second master MiAN.

For another instance, when the parameter is a type of the network accessed by the WAN interface, superiority of the type of the network may be set according to the user preference. For example, when WCDMA network is set to be superior to TD-SCDMA network, if the type of the network accessed through the WAN interface of the first master MiAN is a WCDMA network and the type of the network accessed through the WAN interface of the second master MiAN is a TD-SCDMA network, the search order of the working channels of the proximity interface of the first master MiAN is prior to the search order of the working channels of the proximity interface of the second mater MiAN.

2) when Two or More Parameters are Taken into Consideration

When two or more parameters are taken into consideration, the priority of each parameter is determined at first, and then the same parameter of the master MiANs of the first kind is judged sequentially in a descending order of the priorities, so as to determine the search order of the working channels. When it is judged that a first parameter of the first master MiAN is better than a first parameter of the second master MiAN, the search order of the working channels of the proximity interface of the first master MiAN is prior to the search order of the working channels of the proximity interface of the second master MiAN. When it is judged that the first parameter of the first master MiAN is equal to the first parameter of the second master MiAN, it continues to judge a second parameter of the first master MiAN and the second master MiAN. The second parameter is a parameter whose priority is lower than the first parameter.

In accordance with the above-mentioned principle, the search order of the channels depends on the parameter with the highest priority. When the parameter of one master MiAN with the highest priority is better than that of another master MiAN with the highest priority, the search order of the working channels corresponding to the master MiAN is prior to the search order of the working channels corresponding to the other master MiAN. When the parameters with the highest priority are equal to each other, the parameters with the second highest priority will be taken into consideration, until the parameters with the lowest priority have been taken into consideration.

For example, when the parameters include the type of the network accessed through the WAN interface, the distance between the slave MiAN and the master MiANs of the first kind and the bandwidth of the WAN interface, presumed that there are four master MiANs of the first kind, i.e., MiANs 1-4, the working channel of the respective proximity interface and the parameters are shown in the following table:

| BSSID | Working Channel | Type of Network | Distance (m) | Bandwidth (bit) |
| --- | --- | --- | --- | --- |
| MIAN1 | 5# | CDMA | 30 m | 2M |
| MIAN2 | 1# | WCDMA | 30 m | 5M |
| MIAN3 | 11# | WCDMA | 80 m | 6M |
| MIAN4 | 3# | TD-SCDMA | 60 m | 1M |

Presumed that distance has a priority higher than bandwidth and bandwidth has a priority higher than type of network, it can be seen that the distance between the slave MiAN and MiAN 1 or MiAN 2 is the shortest. Since the bandwidth of MiAN 2 is better than that of MiAN 1, the search order of Channel 5# will be the first.

According to the embodiment of the present invention, when a parameter has a continuous value range, the value range may be divided into several (e.g., more than two) numerical ranges that are not overlapped with each other. The values within the same numerical range may be considered as equal. When the first parameter has a continuous value range, whether the first parameter of the first master MiAN is better than that of the second master MiAN is determined upon whether a first numerical range of the first parameter of the first master MiAN is better than a second numerical range of the first parameter of the second master MiAN. If the first numerical range is identical to the second numerical range, it is judged that the first parameter of the first master MiAN is equal to the first parameter of the second master MiAN. To be specific, superiority of the numerical ranges may be determined according to the influence of the values in the numerical ranges on the parameter.

For example, presumed that the distance is divided in advance into a first range of 0-50 m, a second range of 50-100 m, and a third range of 100-500 m, MiAN3 and MiAN4 in the above table are in the second range. At this time, the parameter with the highest priority, i.e., the distance, may be considered as equal. Then, the parameter with the second highest priority, i.e., bandwidth, will be taken into consideration. Since MiAN 3 has a bandwidth greater than MiAN4, the search order of Channel 11# is prior to that of Channel 3#.

Figure 6:
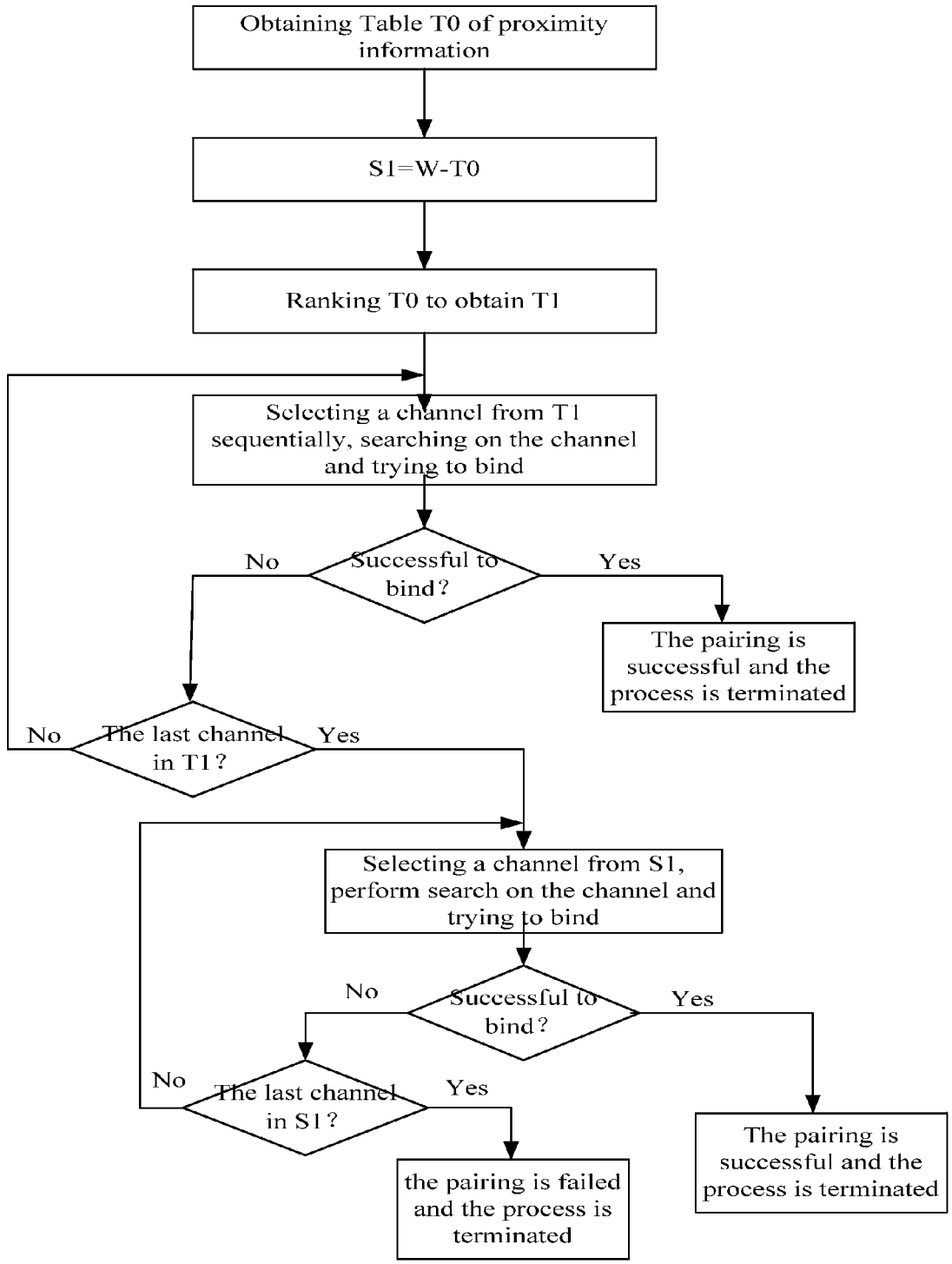
FIG. 6 is a flow chart of Step 43 according to embodiments of the present invention.

FIG. 6 shows a specific way for implementing Step 43. The slave MiAN obtains the proximity information from the server, specifically a table T0 containing the proximity information of the master MiAN of the first kind. The table T0 includes the working channels of the master MiANs of the first kind, as well as the parameters as mentioned above. The slave MiAN generates a table S1, which is obtained by removing the channels in T0 from all the channels on which the proximity interface can work. The channels in the table T0 are ranked by the slave MiAN according to a predetermined strategy to obtain a table T1. Then, the slave MiAN performs search on the channels in the table T1 one by one. When a master MiAN is found, the slave MiAN tries to bind to it. If it is successful to bind to the master MiAN, the pairing is completed and the process is terminated. If it fails to find a master MiAN or a mater MiAN is found but the binding thereto is failed, the slave MiAN tries to perform search on the next channel in the table T1, until it is successful to bind to a master MiAN or all the channels in the table T1 have been searched.

If it is still unsuccessful to bind to a master MiAN until all the channels in the table T1 have been searched, pairing is performed on the remaining channels in accordance with the conventional process of finding and pairing, until all the channels have been searched, i.e., search is performed on the channels in the table S1 one by one. If a master MiAN is found, the slave MiAN tries to bind to it. If it is successful to bind to the master MiAN, the pairing is completed and the process is terminated. If it fails to find a master MiAN or a mater MiAN is found but the binding thereto is failed, the slave MiAN tries to perform search on the next channel in the table S1, until it is successful to bind to a master MiAN or all the channels in the table S1 have been searched.

If all the channels in the table S1 have been searched but the slave MiAN still fails to bind to any master MiAN, the pairing is failed and the process is terminated.

Embodiments of the present invention further provide an MiAN cluster system as shown in FIG. 5. The cluster system comprises a server, one or more master MiANs, and one or more slave MiANs, each of which comprises a Proximity Interface for establishing a communication connection with the other MiANs. Each MiAN further comprises a wireless WAN interface through which the MiAN can access to any standardized cellular network system such as WCDMA, CDMA, WiMAX, LTE and LTE-A, and a wireless LAN interface based on 802.11 WiFi. The proximity interface may be implemented via various communication technologies, for example, via a short-distance communication technology such as Bluetooth or Zigbee.

In the above system, the server is configured to receive a pairing request from the slave MiAN, determine a master MiAN of the first kind according to a first geographical location of the slave MiAN and a geographical location of a master MiAN of the second kind previously obtained and supporting a clustering function where a distance between it and the slave MiAN meets a predetermined threshold, and return the proximity information to the slave MiAN;

the slave MiAN is configured to send a pairing request for requesting a pairing with the master MiAN to the server, the pairing request carrying information of a first geographical location of the slave MiAN, receive the proximity information returned from the server based on the pairing request, the proximity information including information of the working channels of a Proximity Interface of the master MiAN of the first kind, perform search on a corresponding channel based on the proximity information, and establish a communication connection with the Proximity Interface of a master MiAN when the master MiAN is found; and the master MiAN is configured to, when supporting a clustering function, perform registration with the server, and send the information of its geographical location and working channels to the server during the registration.

The server and the slave MiAN in the system will be described detailedly hereinafter.

Figure 7:
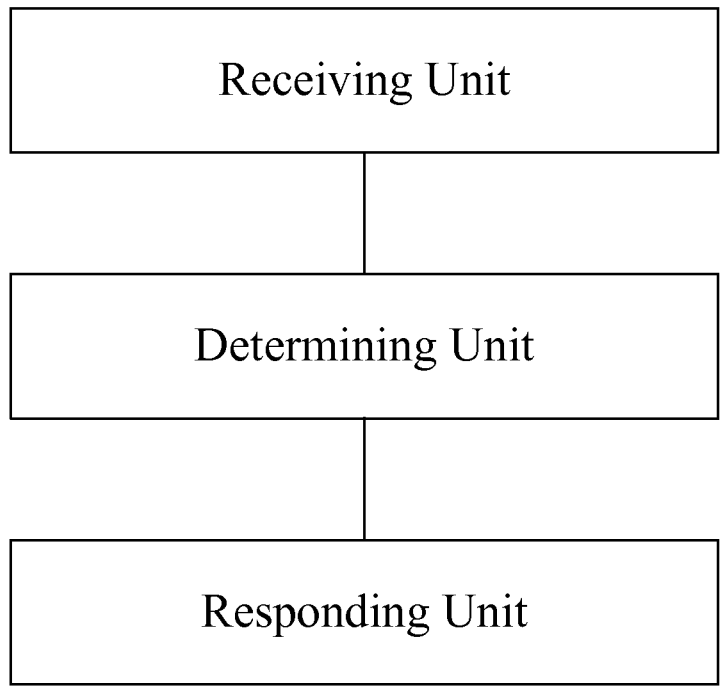
FIG. 7 is a structural schematic view showing a server according to embodiments of the present invention.

Referring to FIG. 7, the server provided in one embodiment of the present invention comprises:

a receiving unit is configured to receive a pairing request for requesting a pairing with a master MiAN from a slave MiAN, the pairing request carrying information of a first geographical location of the slave MiAN;

a determining unit is configured to determine a master MiAN of the first kind according to the first geographical location and a geographical location of the master MiAN of the first kind previously obtained and supporting a clustering function where a distance between it and the slave MiAN meets a predetermined threshold; and a responding unit is configured to return proximity information to the slave MiAN, the proximity information including information of working channels of a proximity interface of the master MiAN of the first kind, so that the slave MiAN searches the master MiAN on a corresponding channel, and to establish a communication connection between the proximity interfaces of the slave MiAN and a master MiAN when the master MiAN is found.

The pairing request from the slave MiAN may further carry information of search radius. At this time, the determining unit may be further configured to determine the predetermined threshold according to the search radius.

The server may obtain the relevant information of the master MiAN of the second kind supporting the clustering function during the registration. At this time, the server may further comprise: a registering unit is configured to accept registration of the master MiAN of the second kind, and obtain the information of the geographical location and the working channels during the registration from the server.

In order to judge the search order, the server may further comprise:

a parameter obtaining unit is configured to obtain parameters such as a current load of a WAN interface of the master MiAN of the second kind, a bandwidth of the WAN interface, and a type of the network accessed through the WAN interface; and a second order determining unit is configured to determine the search order of the working channels of the proximity interface of the master MiAN of the first kind according to at least one of the parameters selected from the group consisting of a distance between the master MiAN of the first kind and the slave MiAN, a bandwidth of the WAN interface of the master MiAN of the first kind, a current throughput of the WAN interface, and a type of the network accessed through the WAN interface, and send the search order to the slave MiAN, so that the slave MiAN performs the search on the corresponding channels sequentially according to the search order.

In a preferred embodiment, when there are two or more parameters, the second order determining unit comprises:

a second priority determining unit is configured to determine a priority of each of the two or more parameters; and a second judging unit is configured to judge superiority of the same parameter of the master MiANs of the first kind sequentially in a descending order of the priorities of the parameters, so as to determine the search order of the working channels, wherein when it is judged that a first parameter of a first master MiAN is better than a first parameter of a second master MiAN, the search on the working channels of the Proximity Interface of the first master MiAN is performed prior to that on the working channels of the Proximity Interface of the second master MiAN.

Figure 8:
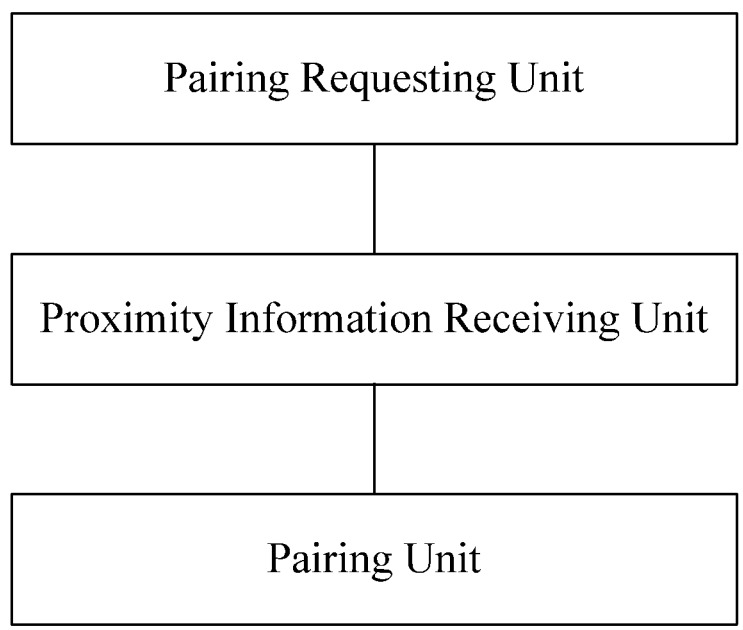
FIG. 8 is a structural schematic view showing a slave MiAN according to embodiments of the present invention.

Referring to FIG. 8, the slave MiAN provided in one embodiment of the present invention comprises:

a pairing requesting unit is configured to send a pairing request for requesting a pairing with a master MiAN to the server, the pairing request carrying information of a first geographical location of the slave MiAN;

a proximity information receiving unit is configured to receive proximity information returned from the server based on the pairing request, the proximity information including information of the working channels of the proximity interface of the master MiAN of the first kind, the master MiAN of the first kind being a master MiAN determined by the server according to the first geographical location and a geographical location of the master MiAN of the second kind previously obtained and supporting a clustering function where a distance between it and the slave MiAN meets a predetermined threshold; and a pairing unit is configured to perform search on the corresponding channels based on the proximity information, and establish a communication connection between the proximity interfaces of the slave MiAN and a master MiAN when the master MiAN is found.

Here, the pairing request further carries information of search radius, so that the server determines the predetermined threshold according to the search radius.

When the proximity information returned from the server further includes at least one of the parameters selected from the group consisting of a distance between the master MiAN of the first kind and the slave MiAN, a bandwidth of a WAN interface of the master MiAN of the first kind, a current throughput of the WAN interface, and a type of the network accessed through the WAN interface, the slave MiAN may determine the search order. At this time, the pairing unit comprises:

a first order determining unit is configured to determine a search order of the working channels of the proximity interface of the master MiAN of the first kind according to the at least one parameter; and a searching unit is configured to perform search on the corresponding channels sequentially according to the search order.

In a preferred embodiment, when there are two or more parameters, the first order determining unit comprises:

a first priority determining unit is configured to determine a priority of each of the two or more parameters; and a first judging unit is configured to judge superiority of the same parameter of the master MiANs of the first kind sequentially in a descending order of the priorities of the parameters, so as to determine a search order of the working channels, wherein when it is judged that a first parameter of a first master MiAN is better than a first parameter of a second master MiAN, the search on the working channels of the Proximity Interface of the first master MiAN is performed prior to that on the working channels of the Proximity Interface of the second master MiAN.

The functional members described in the specification are referred to as modules, so as to emphasize the independence of the implementation in a more particular manner.

According to the embodiments of the present invention, the modules may be implemented by software, so as to be executed by various processors. For example, an identified, executable code module may comprise one or more physical or logical blocks including computer instructions, and the module can be constructed as an image, a process or a function. Even so, the executable codes of the identified modules are unnecessary to be physically located together, and instead may comprise different instructions stored in different locations. When these instructions are logically combined together, they form the modules and achieve the prescribed purposes of the modules.

Actually, the executable code module may be a single instruction or a plurality of instructions, and can even be distributed at different code segments, in different programs, or across a plurality of memory devices. Also, operational data may be identified in the modules, implemented in any appropriate form, and organized in any data structure of an appropriate type. The operational data may be collected as a single data set, or distributed at different locations (including different memory devices), and may be at least partially present in a system or network merely as an electronic signal.

When the modules can be implemented by software, considering the current hardware level, a person skilled in the art can build a corresponding hardware circuit to achieve the corresponding function if taking no account of the cost. The hardware circuit comprises a conventional very-large-scale integration (VLSI) circuit, a gate array, an existing semiconductor such as a logic chip and a transistor, or other discrete components. The modules may further be implemented by a programmable hardware device, such as a field-programmable gate array, a programmable array logic device and a programmable logic device.

The above are merely the embodiments of the present invention. It should be noted that, a person skilled in the art may further make improvements and modifications without departing from the principle of the present invention, and these improvements and modifications shall also be considered as the scope of the present invention.

What is claimed is:

1. A method for finding and selecting partners in a Mobile Internet Access Node (MiAN) cluster system including a server, a plurality of MiANs, the plurality of MiANs including at least a master MiAN and at least a slave MiAN, each of the plurality of MiANs including a Proximity Interface for establishing a communication connection with the other MiANs of the plurality of MiANs, the method comprising:

sending, by the slave MiAN, a pairing request for requesting a pairing with the master MiAN to the server, the pairing request carrying information of a first geographical location of the slave MiAN;

receiving, by the slave MiAN, proximity information returned from the server based on the pairing request, the proximity information including information of working channels of a Proximity Interface of a master MiAN of a first kind, the master MiAN of the first kind being determined by the server according to the first geographical location of the slave MiAN and a geographical location of a master MiAN of a second kind previously obtained and supporting a clustering function, wherein a distance between the master MiAN of the first kind and the slave MiAN meets a predetermined threshold; and performing, by the slave MiAN, search on a corresponding channel based on the proximity information, and establishing a communication connection with the Proximity Interface of a master MiAN when the master MiAN is found.

2. The method according to claim 1, wherein the pairing request further carries information of search radius, and the predetermined threshold is further determined by the server according to the search radius.

3. The method according to claim 1, wherein prior to sending, by the slave MiAN, the pairing request to the server, the method further comprises:

registering, by the master MiAN of the second kind, with the server in advance, and sending information of its geographical location and working channels to the server during the registration so that the server obtains the information of the geographical location and the working channels of the master MiAN supporting a clustering function.

4. The method according to claim 1, wherein the server further obtains parameters including a current load of a WAN interface of the master MiAN of the second kind, a bandwidth of the WAN interface, and a type of the network accessed through the WAN interface;

the server determines a search order of the working channels of the Proximity Interface of the master MiAN of the first kind according to at least one of the parameters selected from a group consisting of a distance between the master MiAN of the first kind and the slave MiAN, the bandwidth of the WAN interface of the master MiAN of the first kind, a current throughput of the WAN interface, and a type of the network accessed through the WAN interface, and sends the search order to the slave MiAN; and the slave MiAN further performs search on the corresponding channels sequentially according to the search order.

5. The method according to claim 1, wherein the server further obtains parameters including a current load of a WAN interface of the master MiAN of the second kind, a bandwidth of the WAN interface, and a type of the network accessed through the WAN interface;

the proximity information further comprises at least one of the parameters selected from a group consisting of a distance between the master MiAN of the first kind and the slave MiAN, a bandwidth of a WAN interface of the master MiAN of the first kind, a current throughput of the WAN interface, and a type of the network accessed through the WAN interface;

the step of performing, by the slave MiAN, search on a corresponding channel based on the proximity information comprises:

determining, by the slave MiAN, a search order of the working channels of the Proximity Interface of the master MiAN of the first kind according to the at least one parameter; and performing, by the slave MiAN, search on the corresponding channel sequentially according to the search order.

6. The method according to claim 4 or 5, wherein when there are two or more parameters in at least one of the parameters, the step of determining a search order of the working channels of the Proximity Interface of the master MiAN of the first kind comprises:

determining a priority of each of the two or more parameters; and judging superiority of the same parameter of the master MiANs of the first kind sequentially in a descending order of the priorities, so as to determine the search order of the working channels, wherein when it is judged that a first parameter of a first master MiAN is better than a first parameter of a second master MiAN, the search on the working channels of the Proximity Interface of the first master MiAN is performed prior to that on the working channels of the Proximity Interface of the second master MiAN.

7. The method according to claim 6, wherein when the first parameter has a continuous value range and the value range is divided into more than two numerical ranges not overlapped with each other in advance, the method comprises:

judging that the first parameter of the first master MiAN is better than the first parameter of the second master MiAN by judging whether a first numerical range of the first parameter of the first master MiAN is better than a second numerical range of the first parameter of the second master MiAN, wherein if the first numerical range is the same as the second numerical range, it is judged that the first parameter of the first master MiAN is equal to the first parameter of the second master MiAN.

8. A slave Mobile Internet Access Node (MiAN), comprising:

a pairing requesting unit, configured to send a pairing request for requesting a pairing with a master MiAN to a server, the pairing request carrying information of a first geographical location of the slave MiAN;

configured to receive proximity information returned from the server based on the pairing request, the proximity information including information of working channels of a Proximity Interface of a master MiAN of a first kind, the master MiAN of the first kind being determined by the server according to the first geographical location of the slave MiAN and a geographical location of a master MiAN of a second kind previously obtained and supporting a clustering function, wherein a distance between the master MiAN of the first kind and the slave MiAN meets a predetermined threshold; and a pairing unit, configured to perform search on a corresponding channel based on the proximity information and establish a communication connection with the Proximity Interface of a master MiAN when the master MiAN is found.

9. The slave MiAN according to claim 8, wherein the pairing request further carries information of search radius so that the server determines the predetermined threshold according to the search radius.

10. The slave MiAN according to claim 8, wherein the proximity information further comprises at least one of the parameters selected from a group consisting of a distance between the master MiAN of the first kind and the slave MiAN, a bandwidth of a WAN interface of the master MiAN of the first kind, a current throughput of the WAN interface, and a type of the network accessed through the WAN interface, the pairing unit comprises:

a first order determining unit configured to determine a search order of the working channels of the Proximity Interface of the master MiANs of the first kind according to the at least one parameter; and a searching unit configured to perform search on corresponding channels sequentially according to the search order.

11. The slave MiAN according to claim 10, wherein when there are two or more parameters in at least one of the parameters, the first order determining unit comprises:

a first priority determining unit configured to determine a priority of each of the two or more parameters; and a first judging unit configured to judge superiority of the same parameter of the master MiANs of the first kind sequentially in a descending order of the priorities, so as to determine the search order of the working channels, wherein when it is judged that a first parameter of a first master MiAN is better than a first parameter of a second master MiAN, the search on the working channels of the Proximity Interface of the first master MiAN is performed prior to that on the working channels of the Proximity Interface of the second master MiAN.

12. A server, comprising:

a receiving unit, configured to receive from a slave Mobile Internet Access Node (MiAN) a pairing request for requesting a pairing with a master MiAN, the pairing request carrying information of a first geographical location of the slave MiAN;

a determining unit, configured to determine a master MiAN of a first kind according to the first geographical location of the slave MiAN and a geographical location of a master MiAN of a second kind previously obtained and supporting a clustering function, wherein a distance between the master MiAN of the first kind and the slave MiAN meets a predetermined threshold; and a responding unit, configured to return proximity information to the slave MiAN, the proximity information including information of working channels of a Proximity Interface of the master MiAN of the first kind, so that the slave MiAN searches the master MiAN of the first kind on a corresponding channel and establishes a communication connection between the proximity interfaces of the slave MiAN and a master MiAN of the first kind when the master MiAN of the first kind is found.

13. The server according to claim 12, wherein the pairing request further carries information of search radius, and the determining unit is further configured to determine the predetermined threshold according to the search radius.

14. The server according to claim 12, further comprising:

a registering unit, configured to accept registration of the master MiAN of the second kind, and obtain the information of the geographical location and the working channels during the registration from the server.

15. The server according to claim 12, further comprising:

a parameter acquiring unit, configured to acquire parameters including a current load of a WAN interface of the master MiAN of the second kind, a bandwidth of the WAN interface and a type of the network accessed through the WAN interface; and a second order determining unit, configured to determine a search order of the working channels of the proximity interface of the master MiAN of the first kind according to at least one of the parameters selected from a group consisting of a distance between the master MiAN of the first kind and the slave MiAN, a bandwidth of a WAN interface of the master MiAN of the first kind, a current throughput of the WAN interface, and a type of the network accessed by the WAN interface, and send the search order to the slave MiAN so that the slave MiAN performs search on the corresponding channels sequentially according to the search order.

16. The server according to claim 15, wherein when there are two or more parameters in at least one of the parameters, the second order determining unit comprises:

a second priority determining unit, configured to determine a priority of each of the two or more parameters; and a second judging unit, configured to judge superiority of the same parameter of the master MiANs of the first kind sequentially in a descending order of the priorities, so as to determine the search order of the working channels, wherein when it is judged that a first parameter of a first master MiAN is better than a first parameter of a second master MiAN, the search on the working channels of the Proximity Interface of the first master MiAN is performed prior to that on the working channels of the Proximity Interface of the second master MiAN.

17. A Mobile Internet Access Node (MiAN) cluster system, comprising a server, a plurality of MiANs, the plurality of MiANs including at least a master MiAN and at least a slave MiAN, each of the plurality of MiANs including a Proximity Interface for establishing a communication connection with the other MiANs of the plurality of MiANs, wherein the server, configured to receive a pairing request from the slave MiAN, determine a master MiAN of a first kind according to a first geographical location of the slave MiAN and a geographical location of a master MiAN of a second kind previously obtained and supporting a clustering function, wherein a distance between the master MiAN of the first kind and the slave MiAN meets a predetermined threshold, and return proximity information to the slave MiAN;

the slave MiAN, configured to send a pairing request for requesting a pairing with the master MiAN to the server, the pairing request including information of the first geographical location of the slave MiAN receive the proximity information returned from the server based on the pairing request, the proximity information including information of the working channels of a Proximity Interface of the master MiAN of the first kind, perform search on a corresponding channel based on the proximity information, and establish a communication connection with the Proximity Interface of a master MiAN of the first kind when the master MiAN of the first kind is found; and the master MiAN, configured to, when supporting a clustering function, perform registration with the server, and send the information of its geographical location and the working channels to the server during the registration.

* * * * *